Dec. 14, 1926.
A. BOSCARIOL
1,610,598
COLLAPSIBLE LIFTING JACK AND BUMPER BRACKET FOR MOTOR VEHICLES
Filed May 18, 1925    2 Sheets-Sheet 1
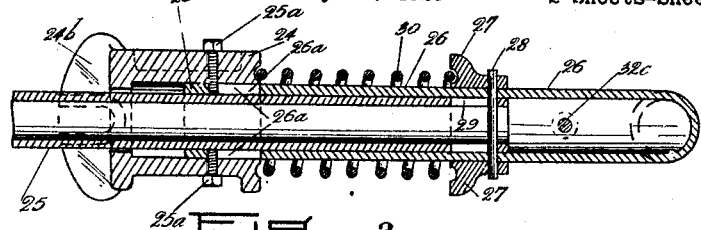
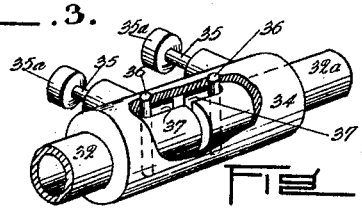
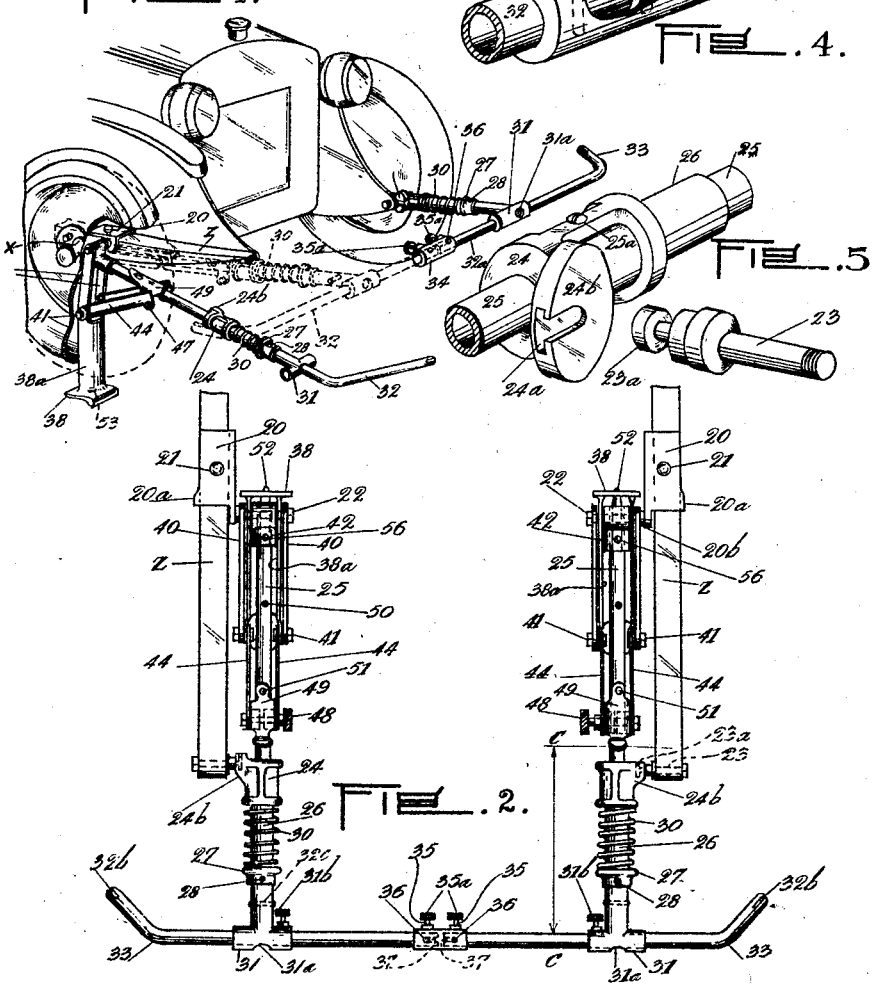
Inventor
A. Boscariol
By Marks & Clerk
Attys.

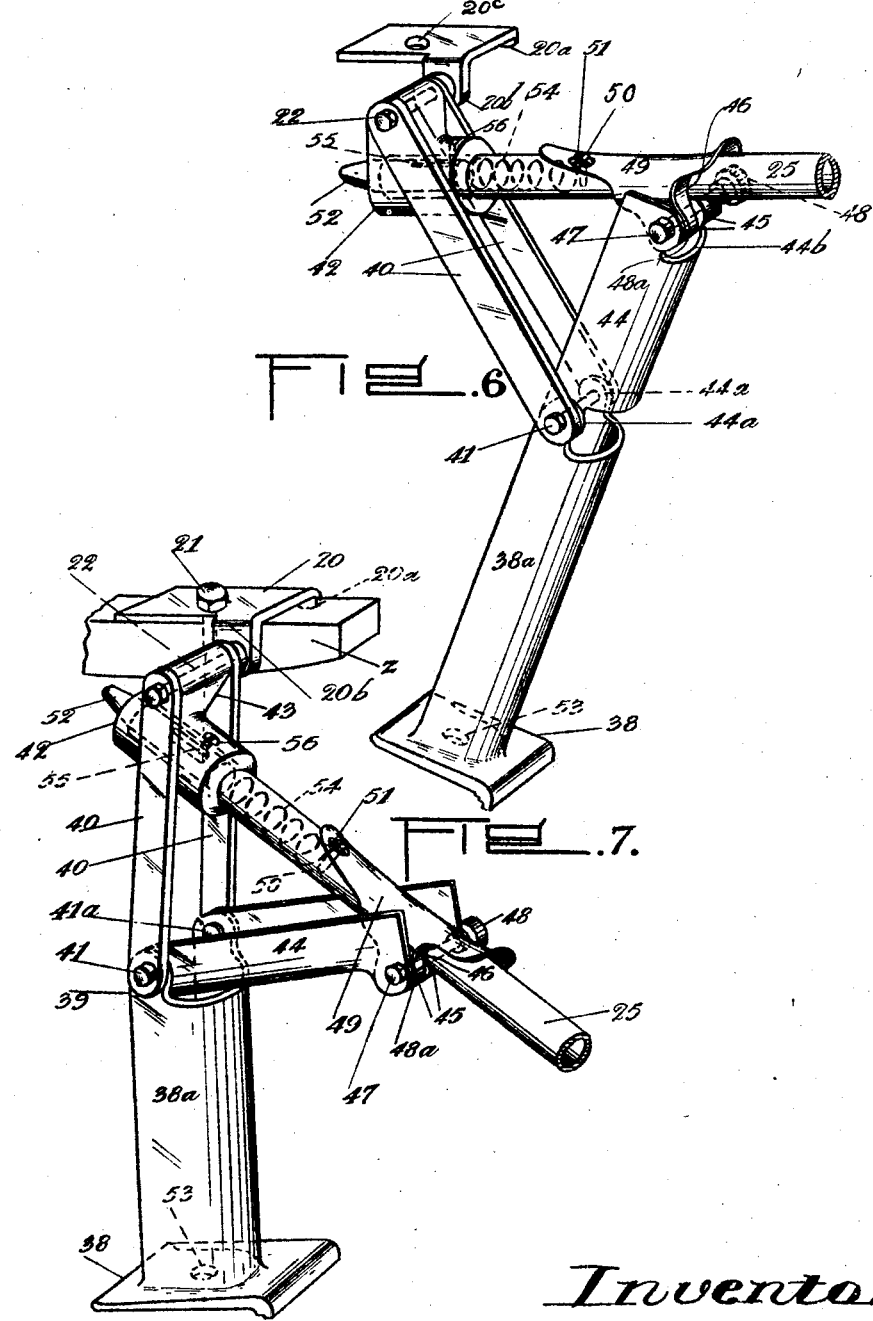

Patented Dec. 14, 1926.

1,610,598

UNITED STATES PATENT OFFICE.

ANTONIO BOSCARIOL, OF SYDNEY, NEW SOUTH WALES, AUSTRALIA, ASSIGNOR OF ONE-THIRD TO FRANK EDWARD MUNTON AND JOHN WILLIAM FLECK, BOTH OF SYDNEY, AUSTRALIA.

COLLAPSIBLE LIFTING JACK AND BUMPER BRACKET FOR MOTOR VEHICLES.

Application filed May 18, 1925, Serial No. 31,231, and in Australia February 18, 1925.

The object of this invention is to provide a collapsible lifting jack that may be used as such or as a bracket for the bumper bar of a motor vehicle and to so attach the bumper bars to the brackets that the parts thereof may be quickly detached and used for the purpose of lengthening the lever that operates the lifting jack.

The lifting jack is so designed that when not in use as such the parts that form the lever will act as a combined thrust rod and bracket to the forward end of which the bumper bar is detachably secured, the other parts thereof being so shaped and arranged that they may be collapsed and lie about and parallel with the lever. The whole appliance is therefore compact and is devoid of any dangerous or inconvenient projections.

Where front bumper bars only are used there will be one pair of lifting jacks, one at each side of the vehicle but where front and rear bumper bars are installed two pairs of lifting jacks will be necessary.

In the accompanying drawings—

Fig. 1 is a perspective view of the front portion of a motor vehicle provided with my combined bumper bar brackets and lifting jacks, the normal position of the appliances at the right hand side of the vehicle being shown in dotted lines, the operative position of the appliances at that side of the vehicle, in its raised position, being shown in full lines.

Fig. 2 is a plan of the combined bumper bar brackets and lifting jacks in their normal position secured to the front springs of a motor vehicle.

Fig. 3 is a longitudinal section of that part of the lifting jack marked C—C at Fig. 2.

Fig. 4 is an enlarged perspective view of the coupling socket that is used for coupling the inner ends of the bumper bar together, a section being broken away in order to show the means adopted for preventing the two members of the bar from turning in the coupling.

Fig. 5 is an enlarged perspective view of a combined buffer block and connector in which a portion of the main thrust rod (or lever according to the capacity in which it is used) may limitably slide, and which serves as a buffer block for the buffer spring as well as providing a means for detachably securing the jack to the forward end of the front spring of the vehicle for the purpose of supporting the forward end of the jack and a member of the bumper bar. At this figure is also shown a portion of a double headed bolt that is provided in place of one of the spring pins or bolts by which the body of the vehicle is secured to its springs.

Fig. 6 is an enlarged perspective view of the lifting jack removed from the vehicle, a portion of the operating lever having been broken away in order to economize space, the parts being shown in the position they will occupy prior to the "load" being taken by the lever.

Fig. 7 is a perspective view similar to Fig. 6 but a portion of the vehicle spring is also shown and the parts are shown in the position they will occupy after the "load" has been taken by the lever and the vehicle raised to the highest point.

The main support for the combined lifting jack and bumper bar bracket consists of a specially shaped plate 20 adapted to be seated centrally in the concavity of each of the lower members of the spring of the motor vehicle. These plates are so shaped that by changing them from one side of the vehicle to the other, the lifting jacks may both be situated inside or outside of their respective vehicle springs. In some cases bumper bars are used both at the front and rear of the motor vehicle and this invention may be applied with equal efficiency in such cases as well as in those cases where only front bumper bars are used. One of or a portion of one of the longitudinal edges of the plate 20 is bent downwardly as at 20$^a$, a turned down lug 20$^b$ being formed upon a portion of the other longitudinal edge. The plate 20 is also provided with a central hole 20$^c$ to enable it to be securely fastened in position by the bolt 21 that secures the spring Z of the vehicle to the axle X, the lug 20$^b$ and the turned down edge 20$^a$ preventing the plate from turning upon the bolt.

The rear end of the lifting jack is pivotally secured to the lug 20$^b$ by means of the bolt 22, an intermediate support between the axle of the vehicle and the bumper bar being formed by a specially shaped double headed bolt 23 (see Fig. 5) one of the heads 23$^a$ of which is adapted to engage in a T slot 24ᵃ formed in a specially shaped sleeve-like member or hollow buffer block 24. By this latter means the forward end of the lifting jack and the bumper bar are rigidly held in their normal position, the lever then acting as one of a pair of brackets for the bumper bar.

The operating lever of the lifting jack consists mainly of two tubes 25 and 26 respectively, the tube 25 being adapted to slidably fit partly within the tube 26. Upon the inner end of the tube 26 is mounted the specially shaped collar or sleeve-like member 24 which acts as a buffer block 24 into one end of which the rear end of the tube 26 enters, the inner diameter of the other end being reduced to form a bearing for the smaller tube 25. The sleeve-like member 24 is slidably secured to the tube 26 by means of set screws 25ᵃ that pass freely into longitudinal slots 26ᵃ cut in the tube 26, the length of the collar or sleeve-like member 24 and the slots 26ᵃ being such as to enable a sufficient longitudinal movement of the tube 26.

The T slot 24ᵃ is formed in a suitably shaped lug or projection 24ᵇ that will enable the slot to be formed parallel with the axial line of the sleeve-like member 24.

Upon the tube 26 and at a suitable distance from the member 24 is a collar 27, that is rigidly secured thereon by means of a transverse pin 28 that passes through suitable holes in the collar and the tube 26 and also through suitably positioned longitudinal slots 29 cut in the tube 25 in order to permit the tube 26 to slide longitudinally upon the tube 25. Interposed between the collar 27 and the buffer or sleeve-like member 24 is a coil spring 30 that surrounds the tube 26, the opposing faces of the buffer and the collar being preferably provided with annular grooves in which the respective ends of the spring 30 will lie.

The forward end of the tube 26 is provided with a cross tube 31 (Fig. 1) thereby forming a T shaped head. In an axial line with the tube 26 holes 31ᵃ are cut or otherwise formed in the cross tube 31 such holes being preferably the same diameter as the internal diameter of the tube 26. These holes 31ᵃ enable a rod or tube to be inserted in the tube 26 in order to form an extension when the tubes 25 and 26 are to be used as a lever.

As the outer ends of bumper bars are very often bent rearwardly it is particularly convenient for the purpose of this invention that the bumper bar should consist of two tubes or rods 32—32ᵃ either of which is adapted to slide into position through its cross tube 31 as will be seen at Figs. 1 and 2, or be removed therefrom and the rearwardly bent end passed through the holes 31ᵃ into the tube 26 to form an extension of the tubes 25 and 26 when the latter are used as a lever, the bend 33 enables the lever to be moved through a larger arc than would be possible with a straight lever of the same length. This will be readily understood by referring to 33 at Fig. 1. In order to prevent the bumper bar member 32 or 32ᵃ from turning within the tube 26 when it is being used as an extension of the lever, the outer end of each member is slotted as at 32ᵇ, the tube 26 being provided with a horizontally positioned transverse pin 32ᶜ that will lie in the slot 32ᵇ when the member 32 or 32ᵃ is inserted in the tube 26. The members 32—32ᵃ of the bumper bar are coupled together in their normal position by slidably passing the inner ends thereof into the respective ends of a union or socket 34 and secured therein by set screws 35 (Figs. 1, 2 and 4) which are preferably provided with large heads 35ᵃ to enable them to be turned by hand without the use of a tool. The socket 34 may also be provided with fixed transverse pins 36 the inner ends of the bumper bar members 32—32ᵃ each having a slot 37 wherein its respective pin 36 may lie and thereby form an additional means for preventing the bumper bar members from turning in the socket. The cross tube 31 may also be provided with a similar set screw 31ᵇ.

The standard of the lifting jack consists of several parts articulated to one another and to the tube 25 and constructed in such a manner that it will not only be strong and comparatively light but when not in use may be folded parallel with and lie about the tube 25. It consists of a suitably shaped metal foot or base 38, integral with which is a channelled member 38ᵃ the sides of which are extended longitudinally to form lugs 39 to each of which the lower end of one of a pair of links 40 is pivotally secured at 41 and 41ᵃ respectively. The rear end of the tube 25 is provided with a fixed collar 42 integral with which is a projecting lug 43 that is bored at right angles to the tube 25 to enable the latter (which is one member of the lever) to be pivotally mounted upon the bolt 22. The links 40 are also pivotally secured upon the bolt 22 one on each side of the lug 43 so that the collar 42 and the rear end of the tube 25 lie between the links 40. A channelled metal member or link 44 is provided with longitudinally extended sides that form lugs 44ᵃ at one end, the other end also being specially shaped by removing a part of the bottom of the channel at 44ᵇ and forming a downwardly extending lug 45 at each side of the channel, the lugs 44ᵃ being pivotally secured, respectively at 41 and 41ᵃ, whilst the lugs 45 are pivotally secured to a split collar 46 by means of the bolt 47 which is screw threaded to receive a nut 48 preferably of large diameter to enable it to be easily manipulated manually without the use of tools. Upon the tube 25 is a catch plate 49 resembling a saddle in formation and having sides or lugs 48ª that project downwardly and lie interposed between the respective lugs 45 and the split collar 46 where they too are pivotally secured upon the bolt 47. The depth of the sides or lugs 48ª on the catch plate 49 is such as to enable it to be rocked upon its pivot 47 in order that a stud pin or projecting screw head 50 rigidly secured to the tube 25 may be engaged in, or disengaged from, a suitably positioned perforation 51 in the catch plate 49.

The catch plate 49 is brought into operation when the appliances are to be used as a lifting jack, the nut 48 being loosened so that the split collar and its attachments may be slid along the tube until the perforation lies directly over the stud pin or screw head 50 when the perforated end of the catch plate may be depressed; the screw head or pin 50 thereby becomes engaged in the perforation 51 and the upper end of the link 44 is thus held whilst the tubes 25 and 26 are being used as a lever. The catch plate may be operated by a spring interposed between its underside and the split collar 46 so that the pin or screw head 50 will be automatically engaged when the catch plate is moved into position but this has not been shown in the drawings. When the catch plate is disengaged from the screw head 50 and the split collar slid back along the tube 25 to its normal position, the tube 25 will lie within the channelled link 44 the links 40 then lying above and substantially parallel with the tube. In this position the nut 48 may be tightened in order to firmly clamp the split collar to the tube 25. The foot 38 may then be raised until the channelled member 38ª lies in a substantially horizontal position, the collar 42 then lying within the channelled member 38ª. The means provided for retaining the foot 38 and member 38ª in this position consist of a spring operated pin 52 that lies slidably within and normally projecting from the rear end of the tube 25, such pin 52 being depressed against the upper face of the foot 38, as the latter is raised, until the point of extremity of the pin comes into register with a centrally situated hole 53 in the foot 38 when the action of the spring 54 will cause the pin 52 to enter the hole 53 thereby holding the foot in that position and the channelled member 38ª in a horizontal position. The projecting end of the pin 52 is preferably cone shaped so that whilst the pressure exerted upon the pin by the spring 54 will be sufficient to maintain engagement between the foot and the pin downward manual pressure upon the foot will force the pin back against the action of its spring when it is desired to use the appliance as a lifting jack. The pin 52 is provided with a longitudinal slot 55 of a suitable length, the collar 42 and tube 25 being provided with a suitably positioned screw threaded hole through which a screw 56 is passed so that its end will lie freely within the slot 55. The spring 54 is held in compression between the inner end of the pin 52 and the screw or pin 50ª.

It will be obvious that by providing each of the front and rear springs of a motor vehicle with the plates 20 the lifting jack as illustrated particularly at Figs. 6 and 7 could be quickly attached to the lug 20ᵇ on the plate 20, in which case only one lifting jack would be necessary as a separate accessory and could be used on any type of motor vehicle either with or without bumper bars, or the plates 20 could be dispensed with and a seating for the axle formed upon the upper extremity of the lug 43.

When it is desired to release the buffer block or collar 24 from engagement with the double headed spring pin 23 the collar 24 is gripped manually and pulled back against the action of the buffer spring 30 when the T slot 24ª will be freed from the head of the pin 23. As an alternative method of releasing the T slot from the pin 23 the tube 26 could be provided with diametrically opposite longitudinal slots similar to the slots 29 and registering therewith so as to allow the tube 26 to slide longitudinally within the collar 27, such movement being limited by the end of the slot abutting against the pin 28. By this means the tubular cross member 31 could be manually pulled forward pulling with it the tube 26 and collar 24, compressing the spring 30 and disengaging the T slot 24ª from the head 23ª of the pin 23.

I claim—

1. A collapsible lifting jack and bumper bracket for a motor vehicle including a standard, a first class lever pivotally fulcrumed upon said standard in such a manner that in operating the lever the fulcrum point is moved upwardly through an arc in a vertical plane and attachments on the lever and collapsible thereabout so as to lie substantially parallel therewith when collapsed.

2. A collapsible lifting jack and bumper bracket for a motor vehicle and including a standard having a foot, a first class lever, a pair of links pivotally connected to such lever, a second pair of links pivotally and slidably connected to the lever, the other ends of the first and second pairs of links being pivotally connected together and to the upper end of said standard, the links and standard being so arranged that they may be collapsed so as to lie substantially parallel with and about the lever, means for temporarily retaining the slidable end of the second pair of links at a predetermined operative position upon the lever and means for securing the links and standard in their collapsed position.

3. A collapsible lifting jack and bumper bracket for a motor vehicle as claimed in claim 1 and wherein the lever comprises two tubes one of which lies limitably slidable upon and surrounding a length of the other, collars upon the tubes, one of such collars being limitably slidably secured to the outer tube, the other collar being limitably slidable partly upon both the inner and outer tubes, a coil spring surrounding the outer tube and interposed between the collars, articulation means whereby the rear end of the lever is secured to the vehicle spring at or near an axle, means carried by one of the collars for detachably connecting it to one end of the vehicle spring, a bumper bar including two sections, the forward end of the lever terminating in a tubular T piece through which one section of the bumper bar may be slid into position, and means for securing the adjacent ends of the two sections of the bumper bar together and for holding them rigidly in position.

4. A collapsible lifting jack and bumper bracket for a motor vehicle comprising a standard, a first class lever, two pairs of links pivoted to the standard and pivotally connected to the fulcrum point of the lever, articulation means for securing the rear end of the lever to the spring of the vehicle consisting of a plate adapted to be rigidly secured to the vehicle spring having a lug provided with a bolt hole, a collar upon the rear end of the lever provided with a boss bored at right angles to the lever, and a bolt arranged through the lug and perforation in the boss on the collar and through the upper ends of one pair of said links, substantially as and for the purposes set forth.

5. A collapsible lifting jack and bumper bracket as claimed in claim 4, wherein a double headed pin is mounted on one end of the vehicle spring, a collar on the lever, a coil spring for detachably securing and normally holding the collar in engagement with the double-headed pin whereby the forward end of the lever is supported in a horizontal position when the member is adapted to act as a bracket for one half of the bumper bar.

6. A collapsible lifting jack and bumper for a motor vehicle as claimed in claim 1, wherein a tubular piece is arranged on the forward end of the lever and includes a cross member transversely bored axially in a line with the lever, and the bore in the cross member being adapted to receive a section of the bumper bar when the latter has been removed for the purpose of increasing the length of the lever.

7. A collapsible lifting jack and bumper bracket for a motor vehicle as claimed in claim 1, wherein two levers are employed, tubular T pieces fitted on the forward ends thereof and including cross pieces, a bumper bar consisting of two tubes which are adapted to be slid through the cross members of their respective tubular T pieces, one near each side of the vehicle, such cross members of the tubular T pieces lying axially in a line with one another and constituting sockets, in order that the inner end of each of the two halves of the bumper bar may enter therein, and means for removably securing the bumper bars in the cross pieces.

8. A collapsible lifting jack and bumper bracket for a motor vehicle comprising a standard, a lever pivotally fulcrumed thereto, a bumper bar including two sections, a T piece fitted on the forward end of the lever for accommodating one-half of the bumper bar, each section of the bumper bar being bent so that it will be rearwardly inclined when used as a lever extension, each bumper section extremity being provided with a longitudinal slot, a fixed transverse pin positioned within the vertical member of the T piece and engaging the longitudinal slot when the bumper is removed from the cross member of the T piece and inserted in the vertical member of the T piece thereby enabling the said extending portion of the lever to be moved through the greatest arc permitted by the movement of the main portion of the lever upon its pivotal point.

9. A collapsible lifting jack and bumper bracket for a motor vehicle as claimed in claim 2, wherein the means whereby the links and standard are secured in their collapsible position comprise a rockable saddle piece, a split collar secured to the lever and in pivotal connection with the rockable piece and the slidable end of the second pair of links, a radially projecting stud pin on the lever, the saddle piece being provided with a perforation with which said stud pin may be caused to engage by movement of the saddle piece upon its pivotal point, the foot of the standard being provided with a perforation, and a spring operated pin projecting from the perforated end of the lever and adapted to engage with a perforation in the foot of the standard.

10. A collapsible lifting jack and bumper bracket for a motor vehicle having a lever, means for supporting and retaining the lever in horizontal position to enable it to act as a bracket for the bumper bar consisting of a collar and a double-headed pin, substantially as and for the purposes set forth.

In testimony whereof, I have signed my name to this specification.

ANTONIO BOSCARIOL.